(12) United States Patent
Skibo et al.

(10) Patent No.: US 6,752,709 B1
(45) Date of Patent: Jun. 22, 2004

(54) HIGH-SPEED, LOW-COST, MACHINING OF METAL MATRIX COMPOSITES

(75) Inventors: Michael D. Skibo, Carson City, NV (US); David M. Schuster, Reno, NV (US)

(73) Assignee: Metallic Composites for the 21st Century, Inc., Carson City, NV (US)

( * ) Notice: Subject to any disclaimer, the term of this patent is extended or adjusted under 35 U.S.C. 154(b) by 0 days.

(21) Appl. No.: 09/713,140

(22) Filed: Nov. 14, 2000

(51) Int. Cl.[7] ................................................ B23F 21/03
(52) U.S. Cl. ...................................... 451/547; 125/15
(58) Field of Search ............................... 451/540, 541, 451/542, 547, 548; 125/13.01, 15

(56) References Cited

U.S. PATENT DOCUMENTS

| | | | | |
|---|---|---|---|---|
| 4,624,237 A | * | 11/1986 | Inoue | 125/15 |
| 5,876,274 A | * | 3/1999 | Hariu | 451/547 |
| 6,012,977 A | * | 1/2000 | Yoshikawa et al. | 451/541 |
| 6,039,641 A | * | 3/2000 | Sung | 451/540 |
| 6,277,017 B1 | * | 8/2001 | Ji | 451/547 |
| 6,401,705 B1 | * | 6/2002 | Suzuki | 125/15 |

* cited by examiner

Primary Examiner—Dung Van Nguyen

(57) ABSTRACT

A metal matrix composite (MMC) material machining tool and a method for forming such a tool. In one embodiment, the MMC machining tool of the present invention is comprised of a support disk. In this embodiment, the MMC machining tool is further comprised of a plating material which is bonded to at least a portion of the support disk. The present embodiment further recites a plurality of diamond particles coupled to the plating material such that the plurality of diamond particles are securely plated to at least a portion of the support disk. In this embodiment, the plurality of diamond particles are securely plated to the support disk in a manner such that the plurality of diamond particles are adapted to machine metal matrix composite material.

11 Claims, 8 Drawing Sheets

HIGH-SPEED, LOW-COST, MACHINING OF METAL MATRIX COMPOSITES

TECHNICAL FIELD

The present invention generally pertains to the field of metal matrix composites (MMCs). More particularly, the present invention is related to machining of MMCs.

BACKGROUND ART

In recent years there have been numerous improvements in the equipment and in the processing technology for the manufacturing of metal matrix composites (MMCs). The most commercially advanced of these MMCs is the family of stir-cast composites where either low cost silicon carbide or aluminum oxide particulate is mixed into molten aluminum and subsequently solidified in the form of an ingot or a billet. Almost any aluminum alloy can be used as a matrix and the level of particulate can be readily varied from less than 10 to over 30 volume percent. Those MMCs cast into billet or ingot form can be further hot worked through extrusion, rolling, and forging; and foundry MMCs can be remelted and cast into various shapes using modified aluminum foundry procedures. These MMCs, in all of their forms, exhibit the elevated modulus, strength, wear resistance, lowered coefficient of thermal expansion, and many other useful parameters while having a density only slightly above that of aluminum.

The industrialization of stir-cast MMCs has made them available in large quantities and at a low price. The present average price of these MMCs is less than $2.00/lb and a price closer to $1.00/lb is anticipated for the future. These materials are viewed as replacements for existing metals and resin matrix composites where higher performance at low cost is desired. Extruded stir cast billets are currently being used as the drive shaft in some sports cars, certain police vehicles, and various light trucks. Cast foundry MMCs are also being used as the rear brake rotors for the various top-end vehicles, and the MMCs are utilized as brakes in several electric vehicles. Other large volume automotive applications for MMCs under consideration are pump and differential housings, brake calipers, and pulleys.

The use of MMCs in high production applications necessitates low fabricating and finishing costs. Applications such as automotive disk brakes require extensive final machining which must be performed rapidly. To take advantage of the low MMC material costs and improved properties, MMC components must be machined efficiently at a cost near that of common engineering metals. However, since the early efforts in MMC development, many thousands of MMC prototypes and limited production components have been machined using various conventional and non-conventional techniques. There have even been a number of machining studies carried out on simple operations such as drilling, milling, and lathe work which have implied that machining of MMCs is well in hand. In spite of this body of empirical data, the large automotive companies maintain that one of the major barriers to the use of MMCs for brake rotors is the high cost of final machining. As a result, it is a commonly held belief that machining of metal matrix composites is too costly for most commercial high-production applications.

The unusual and sometimes difficult machining characteristics of MMCs are a result of the two phase microstructure consisting of the relatively soft and ductile continuous aluminum alloy matrix reinforced by hard ceramic particles. The average particle size may vary from 8–25 microns with certain composites reinforced with particles of 45 microns or larger. The size of reinforcement has a pronounced affect on machinability and cutting tool life. Many metals have two phase structures, such as cast iron or high silicon aluminum alloys, but in no metal is the difference in hardness as pronounced as in the metal matrix composite. The soft continuous aluminum matrix necessitates that the cutting tool have a sharp edge and have the ability to cut through the matrix while producing discrete chips of material. Since the aluminum matrix has low hardness and modest strength, the theoretical energy required for machining (on a macroscopic scale) is low, and high metal removal rates should be possible.

Unfortunately, the difficulty in machining MMCs arises from the tendency of the hard and abrasive particles thereof to dull the cutting edge of a conventional tool. Conventional high speed steel tools, regardless of the tungsten or cobalt content, do not last more than a few revolutions in contact with the MMC before the cutting edge is dulled. In one conventional approach a tool of sintered tungsten carbide is used in an attempt to machine the MMC. Sintered tungsten carbide is much harder and lasts longer before the edge is dulled by a combination of abrasion and chipping due to the impact of the moving ceramic particles in a rotating work piece on the sharp, but brittle, sintered tungsten carbide tool edge. MMCs containing large particles generate higher kinetic energy and are more likely to cause tool edge chipping. This type of localized cutting edge fracture may be more detrimental to the cutting edge than classical wear. Although they do not demonstrate long tool life, tungsten carbide cutting tools are currently used, with limited success and much difficulty, for certain MMC machining operations and prototype fabrication. MMC finishing by grinding with abrasive grain wheels has never been completely successful as the soft aluminum matrix tends to quickly load the wheels making consistent metal removal impractical.

In another attempt to machine MMCs, various specialized machining techniques such as EDM (electro-discharge machining), laser cutting, and abrasive water jet cutting have been employed. While these techniques have some limited utility, these processes tend to be specialized and very expensive. Hence, these techniques, like the use of sintered tungsten carbide tools, are not applicable for three-dimensional, high production machining of MMCs.

Another conventional approach for machining particle reinforced aluminum matrix composites is to use diamond superabrasives, specifically, single point polycrystalline diamond (PCD) cutting tools. These synthetic polycrystalline diamonds are produced in the form of thin sheets, approximately 0.040 inch (1 mm thick), and have varying grain or crystallite size. The sheets are laser cut into small segments, sintered to tungsten carbide substrates, and then diamond honed to produce a sharp cutting edge on drills, end mills, turning tools, and many other standard insert shapes. PCD tools are flat and do not incorporate any of the complex tool geometries and chip breaking features so common to high speed steel or tungsten carbide inserts and, as a result, have generally been limited to simple machining operations. CVD (chemical vapor deposition) diamond coating technology has been developed to permit the applications of very thin diamond coatings to complex carbide tool shapes. When used for external and internal turning, some milling, and drilling operations on MMCs containing modest loading of particulate, the PCD tools can have reasonable tool life and produce good surface finish.

Unfortunately, the use of PCD tools to machine MMCs has some significant disadvantages. As an example, PCD tools are expensive, costing between 5 and 20 times that of sintered tungsten carbide tools. Whereas a typical tungsten carbide insert will have at least 3 (and as many as 6) cutting points which can be used before the insert is discarded, the PCD insert will only have one. As yet another example of the disadvantages associated with PCD tools, PCD inserts can only take light interrupted cuts and the depth of continuous cuts is limited by the size of the PCD chip in the insert. A further disadvantage to PCD tools lies in the fact that diamond tipped or veined drill bits and end mills are extremely sensitive to impact and uneven loading. Even a slight deviation in the alignment during drilling a hole can irreparably damage a small tool costing many hundreds of dollars. Additionally, PCD tools are, disadvantageously, fragile and require special care to prevent catastrophic failure. As still another significant disadvantage, fluid cooling must be carefully controlled during the use of PCD tools to prevent fracture by thermal shocking of the synthetic polycrystalline diamond.

Further significant drawbacks associated with PCD tools pertain to the fact that, when used to machine MMCs, PCD tools do wear and the edge thereof becomes dull. In a manner similar to tungsten carbide, PCD wear is at least in part a function of chipping damage caused by the shock of ceramic particles in the spinning MMC work piece striking the sharp edge of the synthetic polycrystalline diamond. This condition is most severe in composites where the mean particle size is large and the kinetic energy is high. Although larger PCD grain size may offer increased resistance to chipping as does a greater tool tip radius, even single crystal natural diamond cutting tools become dull by chipping of the cutting edge and do not offer appreciably longer tool life. Thin diamond coatings generally have very poor tool life as the coating is rapidly fractured and stripped away by contact with the particulate.

An additional problem associated with the use of single point PCD tools to machine MMCs is the difficulty in making shallow cuts of approximately 0.001 of an inch (0.025 mm). If the depth of cut is much less than 0.010 of an inch, the MMC cannot be effectively cut by the tool. It is believed that this shortcoming of PCD tools is because the PCD tool edge quickly becomes dull on a microscopic scale. If the depth of cut is small, the MMC will deform under the pressure at the tool tip rather than allowing the tool to penetrate and establish conventional cutting action.

As still another drawback, to maximize tool life, PCD tools and inserts must be removed from service and rehoned at specific intervals. This procedure is not consistent with high speed production machining where tungsten carbide inserts are used and discarded at precise intervals. As a result of the limitations of PCDs many machine shops believe that these tools are not practical nor economical for the rapid material removal required for high volume machining of MMCs.

Recently, a new method of machining hardened ferrous and nickel based monolithic metals has been introduced. This technique is called high efficiency deep grinding (HEDG). In this process, tools are made by plating thousands of 60–80 mesh boron nitride superabrasive particles to a hardened steel disk or symmetrical shaped form. The density of particulate usually is in excess of 1000 particles/square inch. These tools are rotated at high speeds (over 15000 fps) on rigid spindles. High contact pressures are required to produce the desired metal removal rates. Using various cutting lubricants ranging from water soluble oil to hydrocarbon cutting fluid, these tools are used to machine hardened steel at feed rates equal to those employed in the machining of low carbon steel. The size and shape of the boron nitride particles, as well as the particle loading on the disk substrate, are adjusted to maximize cutting efficiency. Although the process resembles grinding or abrasive disk cutting of ceramics, the method of metal removal is more closely related to classical milling. The contact between the many boron nitride particles and the work piece produces microscopic fine chips, not the powdery swarf commonly associated with grinding processes. This machining characteristic may be one of the reasons that high metal removal rates are possible. Since there are many particles which act as miniature cutting edges the life of the tools has been high even when machining hardened tool steel. The blocky but sharp edged boron nitride particles are not susceptible to fracture and tool wear is low. The low cost of boron nitride particulate enable the cutting wheels to be manufactured inexpensively. Worn wheels may be reused by replating with new sharp particles. However, boron nitride is not the optimum material for cutting non-ferrous based MMCs. While the relatively high density of BN particles on the surface of these cutting tools works adequately with hardened steel where chips are very hard and small, a similar tool is not compatible with MMCs where the loading with soft aluminum swarf would quickly prevent further cutting action. Similarly, the small 60–80 mesh particles used in HEDG machining of steels would also encourage rapid loading with MMC swarf.

Thus, a need exists for a method and apparatus which provides for machining of metal matrix composites (MMCs) having hard and abrasive particulate together with a soft metal matrix. A further need exists for a method and apparatus which meets the above need and which does not suffer from the rapid dulling associated with conventional machining tools. Still another need exists for a method and apparatus which meets the above needs and which does not suffer from the expense and fragility associated with conventional machining approaches. Yet another need exists for a method and apparatus which meets the above needs and is more suitable for rapid MMC machining and which enables deep, heavy, interrupted cuts without the risk of loss of a sole cutting edge.

DISCLOSURE OF THE INVENTION

The present invention provides a method and apparatus which provides for machining of metal matrix composites (MMCs) having hard and abrasive particulate together with a soft metal matrix. The present invention further provides a method and apparatus which achieves the above accomplishments and which does not suffer from the rapid dulling associated with conventional machining tools. The present invention further provides a method and apparatus which achieves the above accomplishments and which does not suffer from the expense and fragility associated with conventional machining approaches. The present invention also provides a method and apparatus which achieves the above accomplishments and is more suitable for rapid MMC machining and which enables deep, heavy, interrupted cuts without the risk of loss of a sole cutting edge.

In one embodiment, the MMC machining tool of the present invention is comprised of a support disk. In this embodiment, the MMC machining tool is further comprised of a plating material which is bonded to at least a portion of the support disk. The present embodiment further recites a plurality of diamond particles coupled to the plating material such that the plurality of diamond particles are securely plated to at least a portion of the support disk. In this embodiment, the plurality of diamond particles are securely plated to the support disk in a manner such that the plurality of diamond particles are adapted to machine metal matrix composite material.

In another embodiment, the MMC machining tool of the present invention includes the features of the above described embodiments and further recites that the plurality of diamond particles are securely brazed to at least a portion of the support disk.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
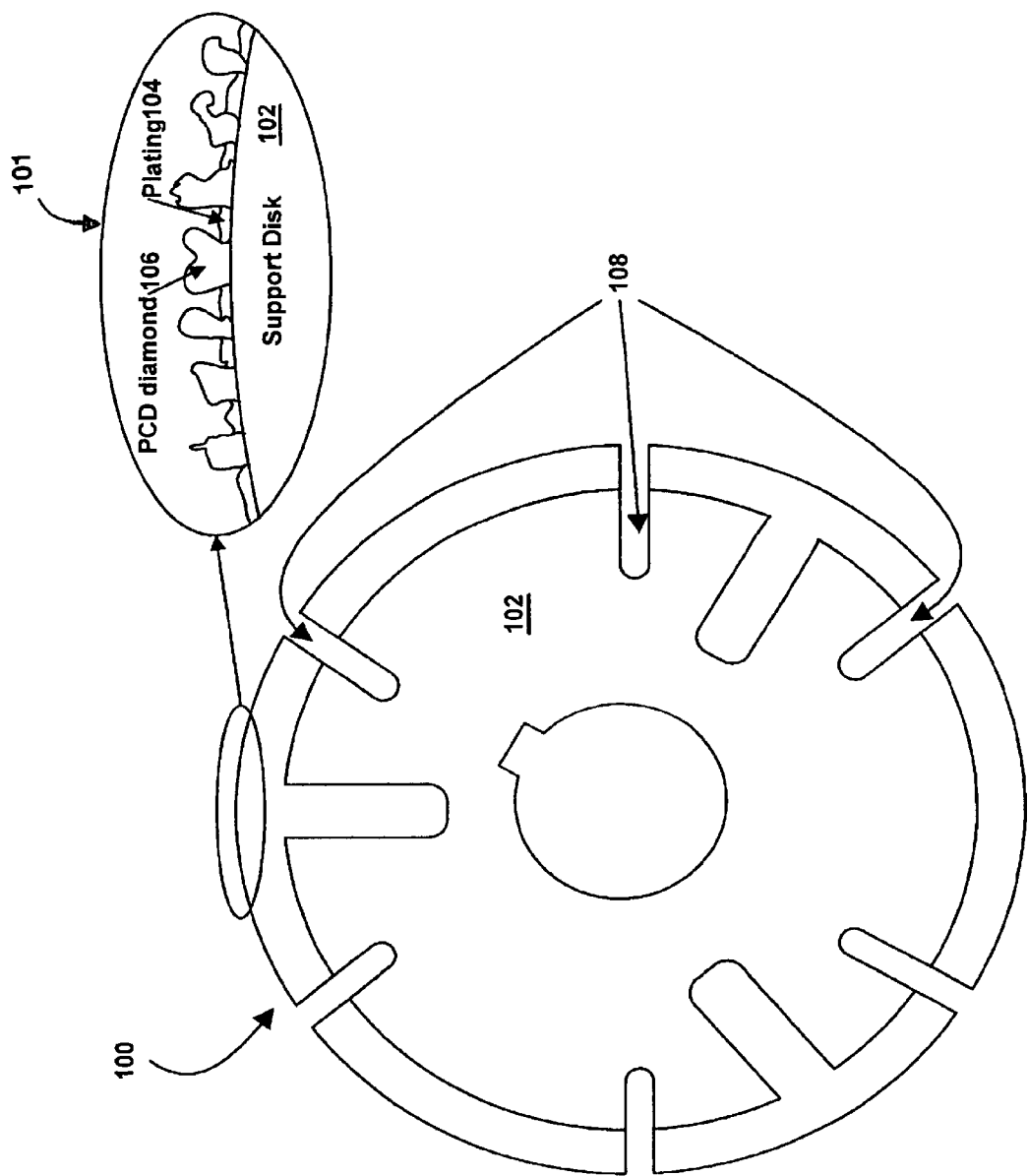
FIG. 1 is a schematic front view and an enlarged view of an MMC machining tool having large blocky PCD particles coupled to a support disk in accordance with one embodiment of the present claimed invention.

With reference now to FIG. 1, a schematic side view of a tool 100 for performing various machining operations (e.g. milling, planing, cutting, and the like) is shown. For purposes of clarity, tool 100 of FIG. 1, and the various other tool embodiments disclosed in the present application are hereinafter referred to as "MMC machining tools." As mentioned above, the hard and abrasive particulate together with the soft aluminum matrix make metal matrix composites difficult to machine using conventional tools. Although the actual machining energy is low, probably not much different than that of unreinforced aluminum, the contact between the particulate of the MMC and the cutting edge dulls the high speed steel and tungsten carbide tools of the prior art. As stated above, conventional PCD tools have the best tool life, but they are expensive and fragile, and the single cutting edge is susceptible to chipping and wear.

Referring still to FIG. 1, in the present embodiment, tool 100 is comprised of a support disk 102 having a large blocky PCD particles coupled thereto. In one embodiment of the present invention, the large blocky PCD particles are plated to support disk 102. In still another embodiment of the present invention, the large blocky PCD particles are brazed to support disk 102. For purposes of brevity only, the following discussion will primarily describe the embodiments of the present invention in which the large blocky PCD particles are plated to support disk 102. It should be noted, however, that following discussion and examples also pertain to the embodiments of the present invention in which the large blocky PCD particles are brazed to support disk 102. Although the present embodiment specifically recites the use of large blocky PCD particles, the present invention is also well suited to having large blocky industrial natural diamond particles plated to support disk 102 instead of, or in addition to, the use of large blocky PCD particles. Support disk 102 to which the diamond particles are plated is made of steel in the present embodiment. Although such a material is used in the present embodiment, the present invention is also well suited to the use of carbide or of other rigid materials for support disk 102. Additionally, dynamically balanced hardened steel disks increase the stability of the MMC machining tools of the present inventions and enable higher rotational feeds and speeds to be achieved. In yet another embodiment of the present invention, further stability of the tools is achieved by plating PCD or industrial natural diamond particles to a high stiffness substrate such as tungsten carbide.

With reference still to FIG. 1, as is shown in FIG. 1, tool 100 has slots (typically shown as 108) formed therein to permit the passage of swarf and coolant. By permitting the passage of swarf and coolant therethrough, slots 108 of the present embodiment allow deeper cuts and higher metal removal rates. Although tool 100 of the present embodiment includes slots to permit the passage of chips and fluids, the present invention is also well suited to an embodiment which includes various other types of MMC machining facilitating features (e.g. flutes, holes, slits, and the like) instead of, or in addition to, slots 108. In the embodiment of FIG. 1, tool 100 is disk shaped, as will be discussed below in conjunction with the embodiments of FIGS. 2–7, the present invention is also well suited to an embodiment in which tool 100 is shaped other than shown in FIG. 1. As an example, tool 100 may be disk shaped, cupped, as well as many other forms. Tool 100 is well suited to having the shape of a fly cutter, an end mill, a grinding disks, and various other tool shapes. Tool 100 of the present embodiment is also well suited to having complex external radii which permit the forming of contours on a work piece. Additional detailed discussion of the various configurations for tool 100 of the present embodiments is recited below.

With reference yet again to FIG. 1, an enlarged view 101 of an edge of tool 100 is shown for purposes of explanation and clarity. As clearly shown in enlarged view 101 of FIG. 1, plating 104 is used to couple PCD particles 106 to support disk 102. PCD particles 106 are generally blocky having sharp edges, and although they are plated to the surface of support disk 102, much of PCD particles 106 are exposed to create a myriad of small cutting points. In the present embodiment, the size of PCD particles 106 plated to the surface of the support disk 102 is important. In the present embodiment, unlike the prior art, large sharp blocky PCD particles 106 are plated to support disk 102. As a result, tool 100 of the present embodiment is able to readily cut deeply into a MMC. More specifically, in the embodiment of FIG. 1, 20 mesh and larger (preferably larger than 40 mesh) PCD particles are bonded by plating to the surface of support disk 102. The use of large blocky PCD particles as recited in the present embodiment enables surface cutting operations with rapid machining at high metal removal rates. Although such a large mesh size is recited in this embodiment, in other embodiments of the present invention, approximately 40 mesh PCD particles are used. Such smaller mesh size embodiments of the present invention are used for slotting operations, for smaller cutting tools, and the like. As mentioned above, although the present embodiment specifically recites the use of large blocky PCD particles, the present invention is also well suited to having large blocky industrial natural diamond particles plated to support disk 102 instead of, or in addition to, the use of large blocky PCD particles 106.

Referring still to FIG. 1, in the present embodiment, the concentration of PCD particles 106 on the surface of tool 100 is also an important parameter. Because each of PCD particles 106 acts as a cutting point, a high density of PCD particles 106 maximizes the life of tool 100 of the present embodiment. That is, in the present embodiment, PCD particles 106 are applied/plated to support disk 102 with a density which prevents MMC swarf and other residue generated in the cutting operation from clogging the surface of tool 100 and prevent further cutting action. Hence, unlike prior art devices, tool 100 of the present embodiment is a robust, relatively inexpensive tool well suited to machining (e.g. cutting) MMCs without clogging, without rapidly dulling, and with an extended life. Additionally, tool 100 of the present embodiment, having multiple PCD particles 106 plated thereto, enables rapid MMC machining with deep, heavy, interrupted cuts without the risk of loss of only a sole cutting edge.

Referring again to FIG. 1, in one embodiment of the present invention, blocky PCD particles 106 are plated to support disk 102 with a concentration between approximately 5 to 1200 diamond particles/square inch when using blocky PCD particles having a size in the range of 20 mesh. In another embodiment of the present invention, blocky PCD particles 106 are plated to support disk 102 with a concentration of up to approximately 5 to 1200 particles/ square inch when using 40 mesh blocky PCD particles. Importantly, unlike conventional devices, the present embodiments provide fast machining rates and minimized loading with composite swarf. Thus, the present invention is well suited to the use of various PCD particle sizes, and to the use of various concentrations of the PCD particles. Although the present embodiment specifically recites certain PCD particle concentrations, the present invention is also well suited to varying the PCD particle concentration to a greater or lesser value than is specifically recited above.

Figure 2:
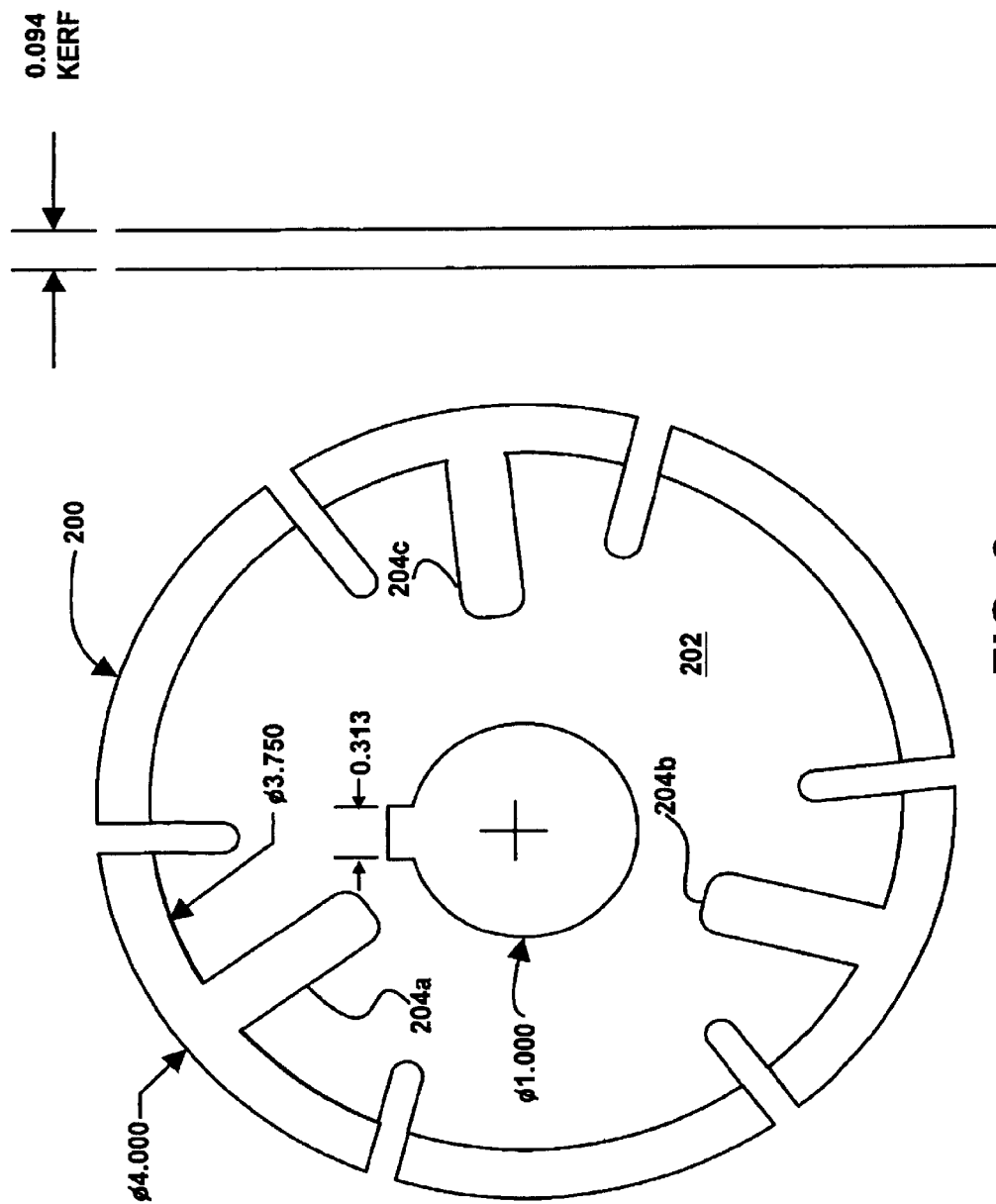
FIG. 2 is a schematic front view and a schematic side view of an MMC machining tool having large blocky PCD particles coupled to the flat face of the support disk in accordance with one embodiment of the present claimed invention.

With reference now to FIG. 2, a schematic front view and a schematic side view of an MMC machining tool 200 is shown in accordance with one embodiment of the present invention. In this embodiment, a support disk 202 has large blocky PCD particles coupled thereto in a manner as was described above in conjunction with the discussion of the embodiment of FIG. 1. Importantly, in FIG. 2, MMC machining tool 200 has a size (dimensions are in inches) such that MMC machining tool 200 is well suited for sawing/cutting of MMCs. Additionally, MMC machining tool 200 of FIG. 2, includes numerous regions, typically shown as 204a, 204b, and 204c, wherein large blocky PCD particles are plated to the flat face of support disk 202. Regions 204a, 204b, and 204c aid in the machining of MMCs.

Figure 3:
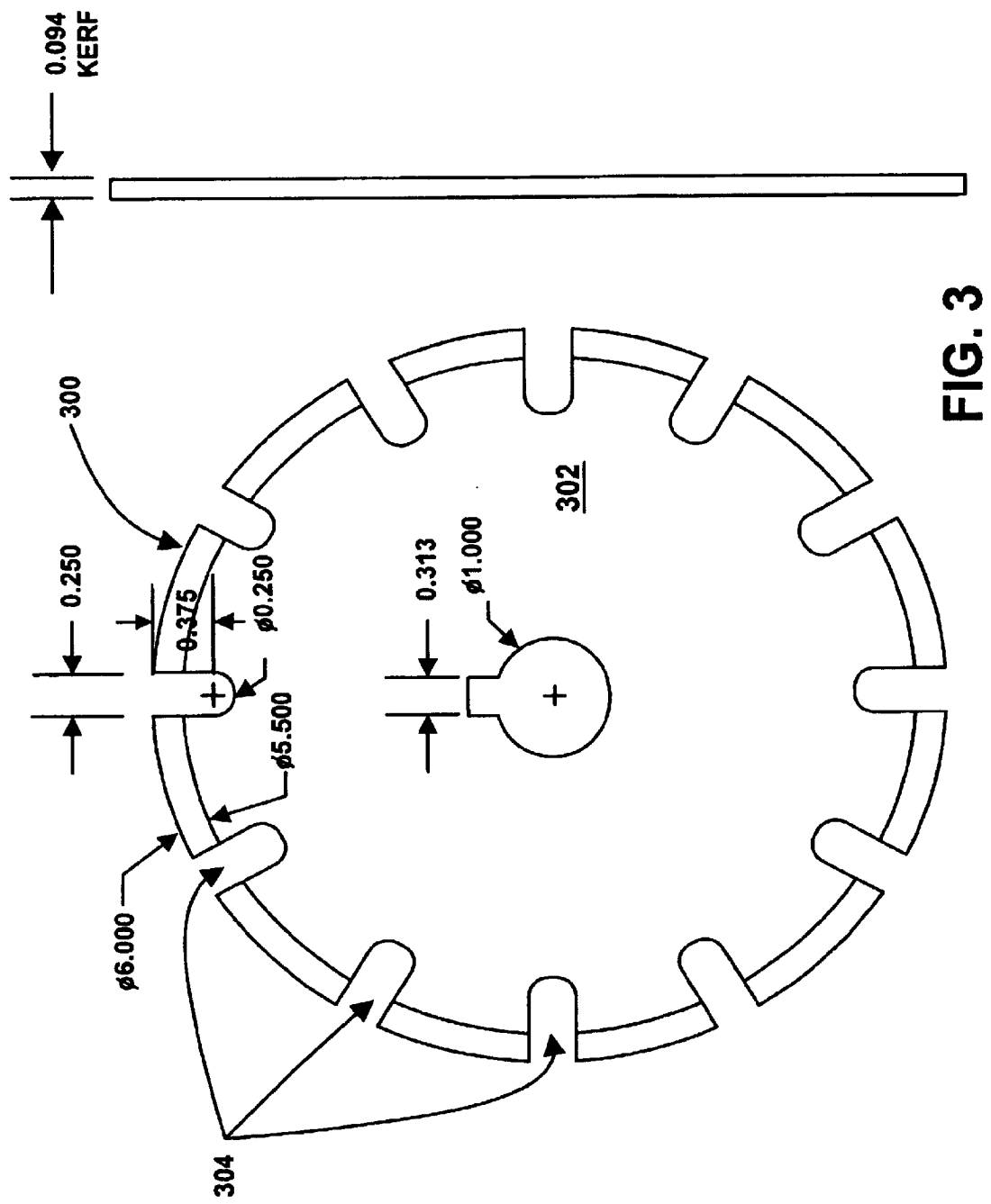
FIG. 3 is a schematic front view and a schematic side view of an MMC machining tool having numerous slots formed therein in accordance with one embodiment of the present claimed invention.

With reference now to FIG. 3, a schematic front view and a schematic side view of an MMC machining tool, 300 is shown in accordance with one embodiment of the present invention. In this embodiment, a support disk 302 has large blocky PCD particles, plated thereto in a manner as was described above in conjunction with the discussion of the embodiment of FIG. 1. Importantly, in FIG. 3, MMC machining tool 300 has a size (dimensions are in inches) such that MMC machining tool 300 is well suited for sawing/cutting of MMCs. Additionally, MMC machining tool 300 of FIG. 3, includes numerous slots, typically shown as 304, which aid in the machining of MMCs.

Figure 4:
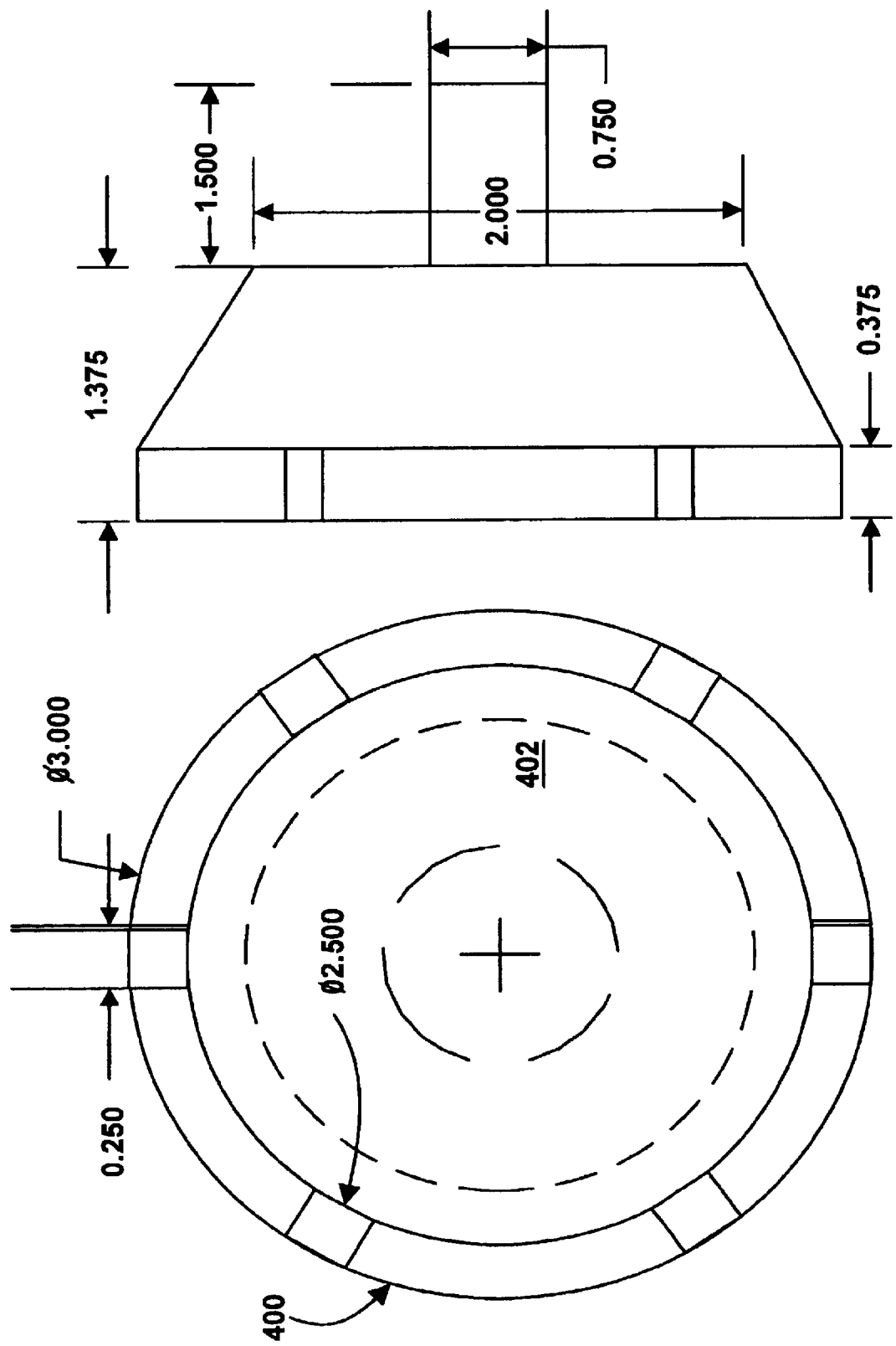
FIG. 4 is a schematic front view and a schematic side view of an end mill MMC machining tool in accordance with one embodiment of the present claimed invention.

With reference now to FIG. 4, a schematic front view and a schematic side view of an MMC machining tool 400 is shown in accordance with one embodiment of the present invention. In this embodiment, a support disk 402 has large blocky PCD particles plated thereto in a manner as was described above in conjunction with the discussion of the embodiment of FIG. 1. Importantly, in FIG. 4, MMC machining tool 400 is configured to be an end mill MMC machining tool. That is, tool 400 of the present embodiment is substantially thicker than the embodiments of FIGS. 1–3 and has a tapered shape such that tool 400 forms an end mill for machining of MMCs.

Figure 5:
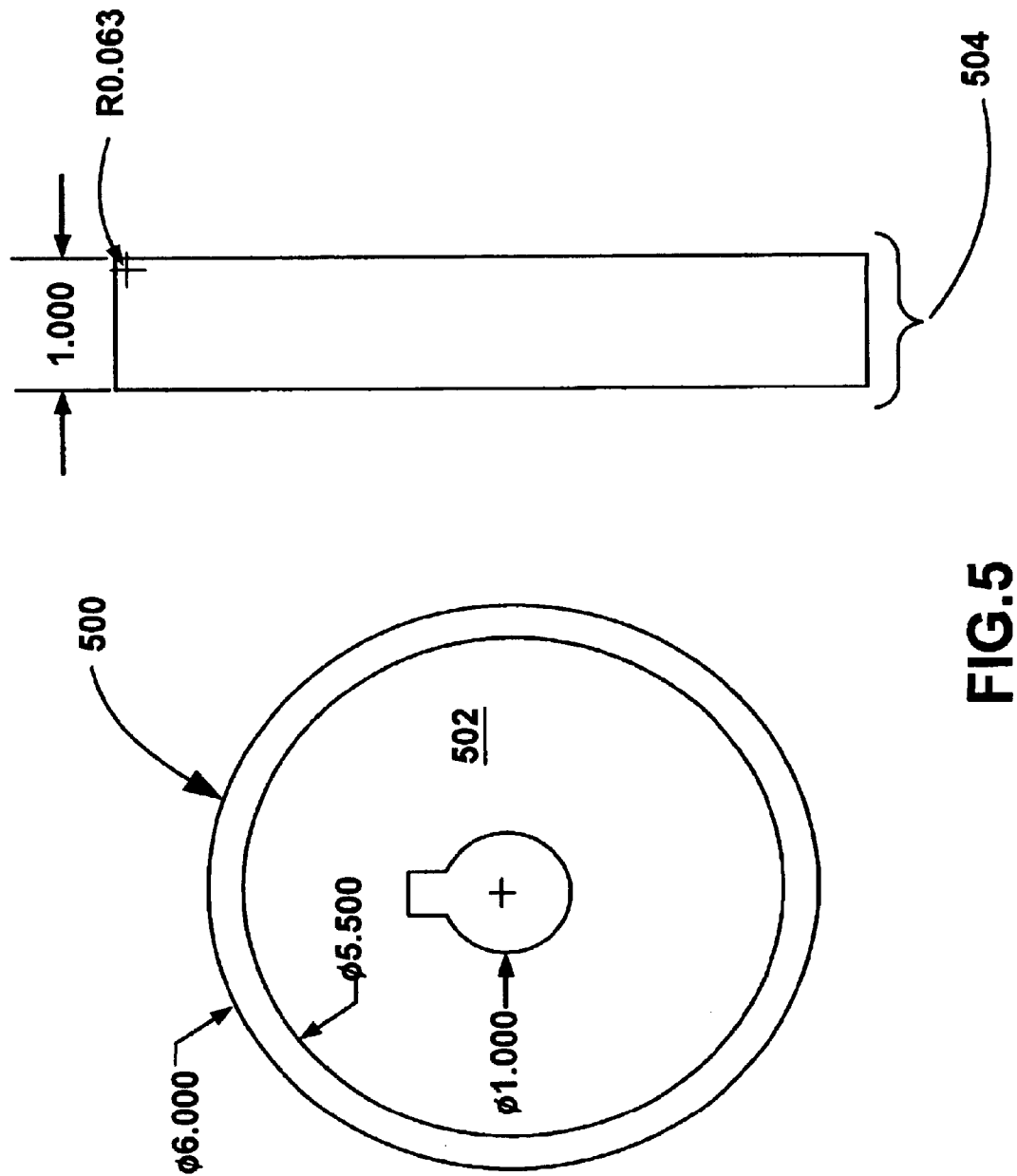
FIG. 5 is a schematic front view and a schematic side view of a wheel-type MMC machining tool in accordance with one embodiment of the present claimed invention.

With reference now to FIG. 5, a schematic front view and a schematic side view of a "wheel-type" MMC machining tool 500 is shown in accordance with one embodiment of the present invention. In this embodiment, a support disk 502 has large blocky PCD particles plated thereto in a manner as was described above in conjunction with the discussion of the embodiment of FIG. 1. Importantly, in FIG. 5, MMC machining tool 500 is configured to be a "wheel-type" MMC machining tool. That is, tool 500 of the present embodiment is substantially thicker than the embodiments of FIGS. 1–3 and has a flat outer edge 504 to which the aforementioned large blocky PCD particles are plated.

Figure 6:
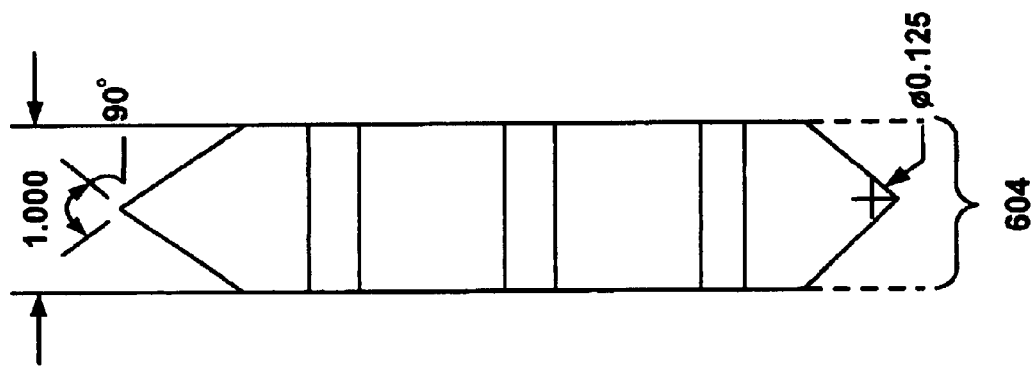
FIG. 6 is a schematic front view and a schematic side view of a pointed wheel-type MMC machining tool in accordance with one embodiment of the present claimed invention.
Figure 6:
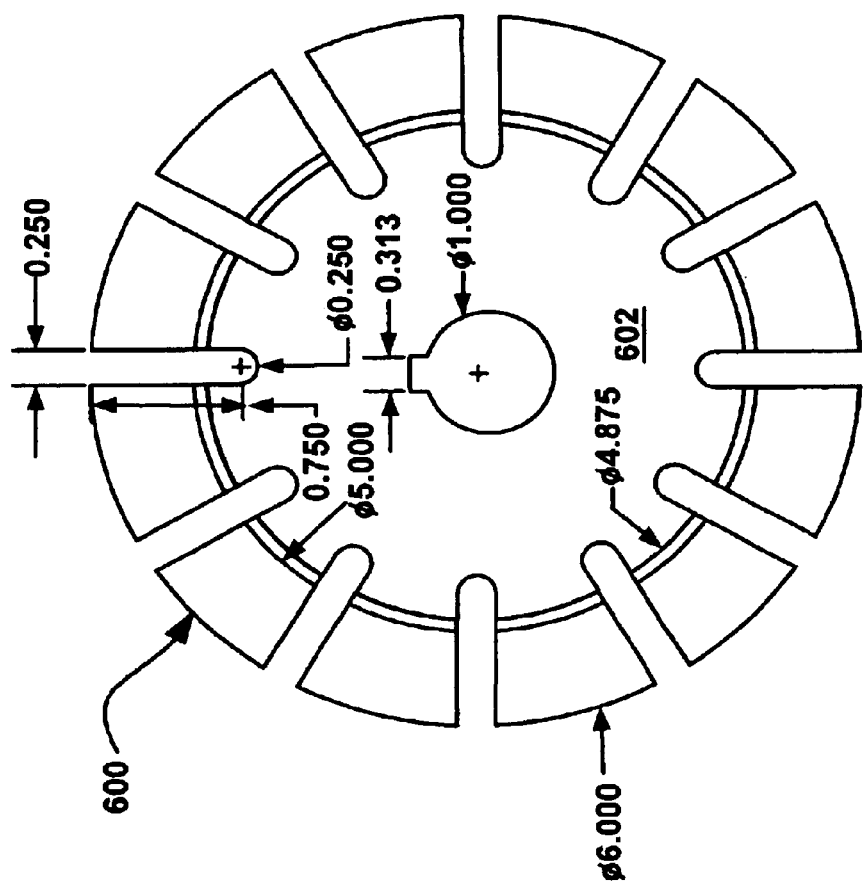

With reference now to FIG. 6, a schematic front view and a schematic side view of another "wheel-type" MMC machining tool 600 is shown in accordance with one embodiment of the present invention. In this embodiment, a support disk 602 has large blocky PCD particles plated thereto in a manner as was described above in conjunction with the discussion of the embodiment of FIG. 1. Importantly, in FIG. 6, MMC machining tool 600 is configured to be a pointed "wheel-type" MMC machining tool. That is, tool 600 of the present embodiment is substantially thicker than the embodiments of FIGS. 1–3 and also has a pointed outer edge 604 to which the aforementioned large blocky PCD particles are plated.

Figure 7:
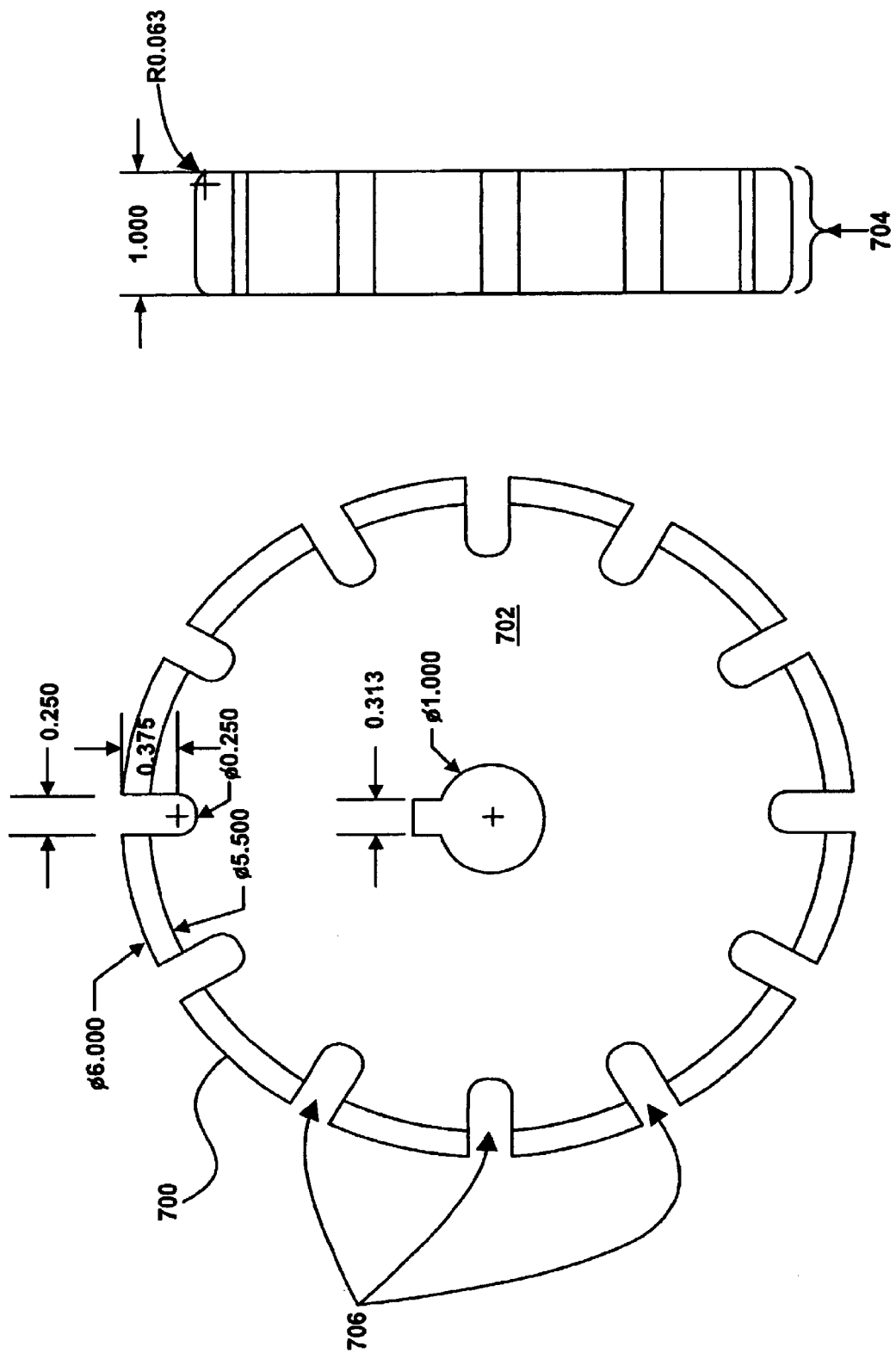
FIG. 7 is a schematic front view and a schematic side view of a wheel-type MMC machining tool having slots formed therein in accordance with one embodiment of the present claimed invention.

With reference now to FIG. 7, a schematic front view and a schematic side view of yet another "wheel-type" MMC machining tool 700 is shown in accordance with one embodiment of the present invention. In this embodiment, a support disk 702 has large blocky PCD particles plated thereto in a manner as was described above in conjunction with the discussion of the embodiment of FIG. 1. Importantly, in FIG. 7, MMC machining tool 700 is configured to be a "wheel-type" MMC machining tool. That is, tool 700 of the present embodiment is substantially thicker than the embodiments of FIGS. 1–3 and has a flat outer edge 704 to which the aforementioned large blocky PCD particles are plated. Additionally, MMC machining tool 700 of the present embodiment has slots typically shown as 706 formed therein.

Figure 8:
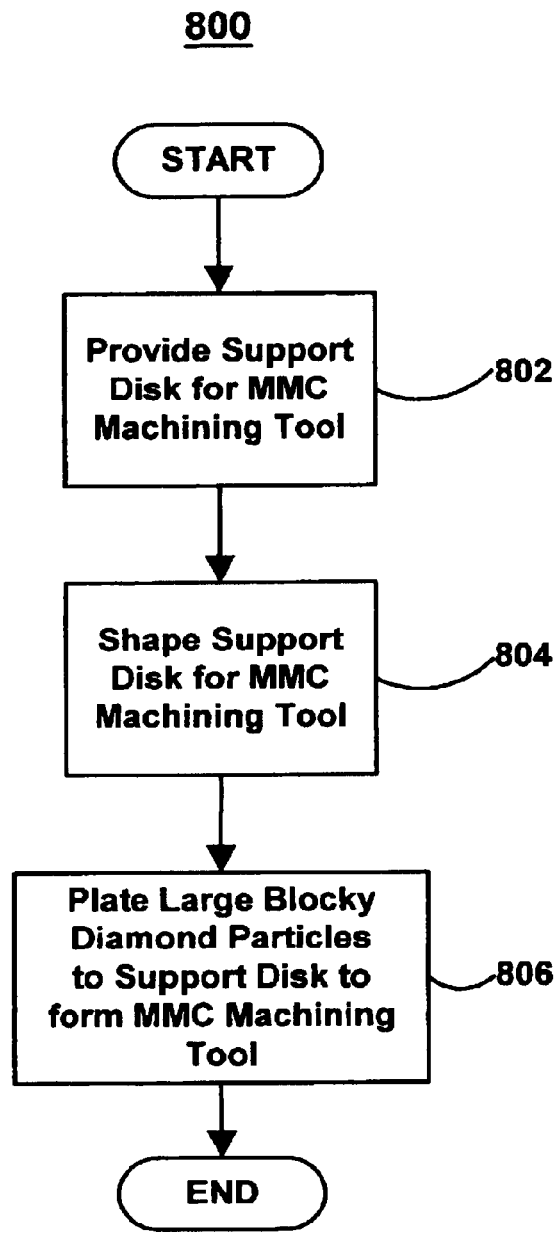
FIG. 8 is a flow chart of steps performed during the fabrication of an MMC machining tool in accordance with one embodiment of the present claimed invention.

With reference now to FIG. 8, a flow chart 800 of steps performed in accordance with one embodiment of the present invention is shown. As recited in step 802, in one embodiment of the present invention, as a starting step in the fabrication of an MMC machining tool, a support disk is provided. In one embodiment of the present invention, the support disk is formed of carbide or of other rigid materials such as, for example, dynamically balanced hardened steel, tungsten carbide and the like. Although step 802 specifically mentions a support disk, the present invention is also well suited to embodiments in which the support piece has a shape other than a disk shape (see e.g. tool 400 of FIG. 4).

Next, at step 804, the present embodiment then shapes the support disk provided at step 802 above. As an example in one embodiment step 804 comprises forming MMC machining facilitating features (see e.g. slots 108 of FIG. 1, slots 304 of FIG. 3, or slots 706 of FIG. 7) into the support disk. The present invention is not limited to the formation of slots into the support disk. That is, the present invention is also well suited to embodiments in which various other shapes and/or openings (e.g. flutes, holes, slits, and the like) are formed into or through the support disk.

Referring now to step 806, the present embodiment then plates large blocky diamond particles to the support disk to complete the formation of the MMC machining tool. As mentioned above, in one embodiment, the large blocky diamond particles are comprised of 20 mesh and larger (preferably larger than 40 mesh) PCD particles which are bonded by plating to the surface of the support disk. As mentioned above, in another embodiment, the 20 mesh and larger (preferably larger than 40 mesh) PCD particles are bonded by brazing to the surface of the support disk. The use of large blocky PCD particles as recited in the present embodiment enables surface cutting operations with rapid machining at high metal removal rates. Although such a large mesh size is recited in this embodiment, in other embodiments of the present invention, approximately 40 mesh PCD particles are used. Such smaller mesh size embodiments of the present invention are used for slotting operations, for smaller cutting tools, and the like. As mentioned above, although the present embodiment specifically recites the use of large blocky PCD particles, the present invention is also well suited to having large blocky industrial natural diamond particles plated to the support disk instead of, or in addition to, the use of large blocky PCD particles.

During operation, the MMC machining tools of the present embodiments are utilized in conjunction with a coolant. In one embodiment flood cooling is used, however, the present embodiment is also well suited to use with coolant spray. More specifically, in one embodiment, water soluble oil mixed with water provided adequate cooling, and was effective in preventing loading of the diamond-plated surface of the MMC machining tool if the depth of cut was not much above 0.010". In other embodiments, various microdrop lubricants, a soluble oil water mixture, a mineral metalworking oil, and synthetic microdrop mists were used as the lubricant. In still another embodiment, hydrocarbon oils were used in conjunction with the MMC machining tools of the present embodiments. Additionally, the MMC machining tools of the present embodiment are also well suited to use at various rotational speeds, such as, for example creating a surface cutting speed of between 100 to 4000 surface feet/minute. MMC machining tools of the present embodiment are also well suited to operating with feed rates varying from 0.0005"/revolution to 0.010"/revolution. MMC machining tools of the present embodiment are also well suited to forming cuts having a depth varying from between 0.005" to 0.040". Although such specific parameters are mentioned herein, the present invention is well suited to varying the conditions and parameters under which the present MMC machining tools are used. In one embodiment, an MMC machining tool of the present invention generated a surface roughness on a metal matrix composite material of better than 32 micro-inches.

Furthermore, the present embodiment is suitable for many different machining operations on MMCs. The present embodiments can be used to mill or plane small or large flat surfaces. The present embodiments can be used to mill grooves and slots. The present embodiments can be used to turn the outside diameter of cylinders. The present embodiments can also be used to generate internal diameters if the diameter is not smaller than the outside diameter of the tool. The present embodiments can be used to generate many types of surfaces of revolution. The external diameter of the tools of the present embodiments may be formed to generate complex radii and combinations of radii, slots, and surfaces. The present embodiments can also be used to drill holes.

Thus, the present invention provides a method and apparatus which provides for machining of metal matrix composites (MMCs) having hard and abrasive particulate together with a soft metal matrix. The present invention further provides a method and apparatus which achieves the above accomplishments and which does not suffer from the rapid dulling associated with conventional machining tools. The present invention further provides a method and apparatus which achieves the above accomplishments and which does not suffer from the expense and fragility associated with conventional machining approaches. The present invention also provides a method and apparatus which achieves the above accomplishments and is more suitable for rapid MMC machining and which enables deep, heavy, interrupted cuts without the risk of loss of a sole cutting edge.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications suited to the particular use contemplated. It is intended that the scope of the invention be defined by the Claims appended hereto and their equivalents.

What is claimed is:

1. A metal matrix composite (MMC) material machining tool, said MMC machining tool comprising:
    a support disk having an outer circumference, two opposing surfaces and a center;
    a first plurality of diamond particles coupled to said outer circumference of said support disk, said first plurality of diamond particles for cutting a metal matrix composite material comprising a metallic matrix and ceramic particles and extending a first distance from said outer circumference toward said center; and
    a second plurality of diamond particles coupled to at least one of said surfaces and for machining said metal matrix composite material, said second plurality of diamond particles forming a plurality of defined regions that extend a second distance from said outer circumference toward said center, said second distance greater than said first distance, wherein said first and second plurality of diamond particles have an average size and a concentration necessary for said cutting and said machining of said metal matrix composite material, said average size in the range of 20 mesh to less than 40 mesh, said concentration in the range of 5–1200 diamond particles per square inch.

2. The metal matrix composite machining tool of claim 1 wherein said support disk is comprised of a high stiffness substrate.

3. The metal matrix composite machining tool of claim 2 wherein said high stiffness substrate is selected from the group consisting of steel, carbide, hardened steel, and tungsten carbide.

4. The metal matrix composite machining tool of claim 1 wherein said first plurality and said second plurality of diamond particles are comprised of polycrystalline diamond (PCD) particles.

5. The metal matrix composite machining tool of claim 1 wherein said first plurality and said second plurality of diamond particles are comprised of industrial natural diamond particles.

6. The metal matrix composite machining tool of claim 1 wherein said metal matrix composite machining tool is adapted to operate with a rotational speed creating a surface cutting speed of approximately 100–4000 feet per minute.

7. The metal matrix composite machining tool of claim 1 wherein said metal matrix composite machining tool is adapted to operate with a feed rate of approximately 0.0005 inches per revolution to 0.010 inches per revolution.

8. The metal matrix composite machining tool of claim 1 wherein said metal matrix composite machining tool is adapted to cut metal matrix composite material wherein said cut has a depth ranging from approximately 0.005 inches to 0.040 inches.

9. The metal matrix composite machining tool of claim 1 wherein said support disk has a thickness in the range of 0.09 to 0.1 one inch.

10. The metal matrix composite machining tool of claim 1 further comprising a plating material bonded to said outer circumference of said support disk, wherein said first plurality of diamond particles are coupled to said plating material.

11. The metal matrix composite machining tool of claim 1 further comprising a brazing material bonded to said outer circumference of said support disk, wherein said first plurality of diamond particles are coupled to said brazing material.

* * * * *